(12) United States Patent
Hirose et al.

(10) Patent No.: US 7,304,808 B2
(45) Date of Patent: Dec. 4, 2007

(54) WIDE-ANGLE LENS SYSTEM

(75) Inventors: Masatoshi Hirose, Toyohashi (JP);
Masashi Isono, Hoi-gun (JP)

(73) Assignee: Konica Minolta Opto, Inc.,
Hachioji-Shi (JP)

( * ) Notice: Subject to any disclaimer, the term of this patent is extended or adjusted under 35 U.S.C. 154(b) by 0 days.

(21) Appl. No.: 11/337,706

(22) Filed: Jan. 23, 2006

(65) Prior Publication Data
US 2006/0171042 A1 Aug. 3, 2006

(30) Foreign Application Priority Data
Jan. 31, 2005 (JP) .............................. 2005-024517

(51) Int. Cl.
*G02B 9/12* (2006.01)
*G02B 13/04* (2006.01)
(52) U.S. Cl. ...................................... 359/784; 359/753
(58) Field of Classification Search ................ 359/664, 359/687, 765, 774, 642, 753, 784
See application file for complete search history.

(56) References Cited

U.S. PATENT DOCUMENTS

| | | | | |
|---|---|---|---|---|
| 5,675,440 | A * | 10/1997 | Kanamori | 359/686 |
| 2004/0021958 | A1 * | 2/2004 | Mizuguchi | 359/793 |
| 2005/0024737 | A1 * | 2/2005 | Takeuchi | 359/680 |
| 2006/0227434 | A1 * | 10/2006 | Hirose et al. | 359/749 |

FOREIGN PATENT DOCUMENTS

| | | |
|---|---|---|
| CN | 2109580 U | 7/1992 |
| JP | 6-34879 A | 2/1994 |
| JP | 2001-337268 A | 12/2001 |
| JP | 2004-102162 A | 4/2004 |

OTHER PUBLICATIONS

Chinese "The Second Office Action", dated Jul. 27, 2007, for counterpart Chinese Patent Application No. 200610004669.3, along with and English-translation thereof.

* cited by examiner

Primary Examiner—David N. Spector
(74) Attorney, Agent, or Firm—Sidley Austin LLP

(57) ABSTRACT

A wide-angle lens system includes: from the object side, (1) a first lens element formed of glass having both surfaces thereof so formed as to be spherical, having a meniscus shape convex to the object side, and having a negative optical power; (2) a second lens element formed of plastic having a meniscus shape convex to the image side and having a positive optical power; (3) an aperture stop; and (4) a third lens element formed of plastic having a meniscus shape convex to the image side and having a positive optical power, and the wide-angle lens system includes three lens elements in total. This permits providing a low-cost, compact super-wide-angle lens system having a favorable optical performance.

8 Claims, 4 Drawing Sheets

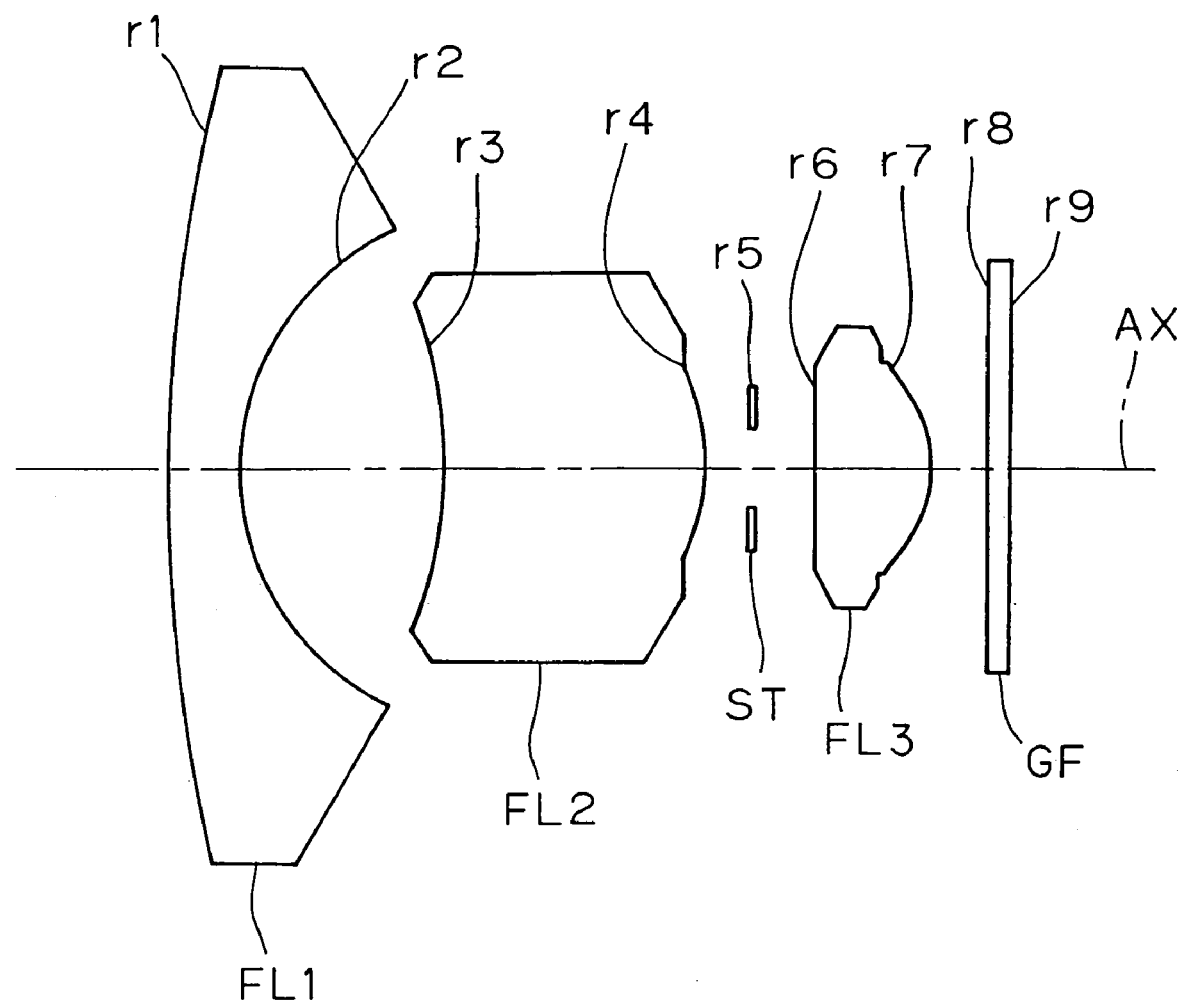

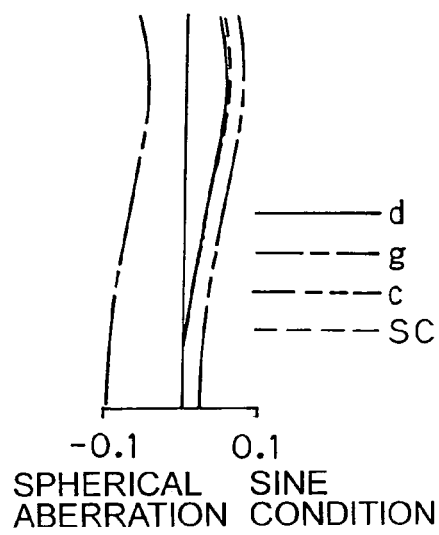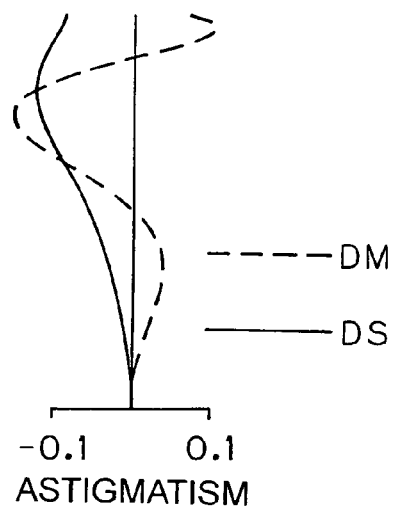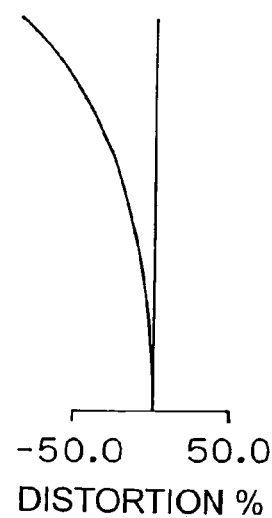

FNO=2.80

Y'=3.0

Y'=3.0

WIDE-ANGLE LENS SYSTEM

This application is based on Japanese Patent Application No. 2005-024517 filed on Jan. 31, 2005, the contents of which are hereby incorporated by reference.

BACKGROUND OF THE INVENTION

1. Field of the Invention

The present invention relates to a compact wide-angle lens system, and more specifically to a low-cost, compact super-wide-angle lens system for a solid-state image sensor, which super-wide-angle lens system is suitable for a digital image pickup apparatus such as a TV telephone, a video intercom, a monitoring camera, an on-vehicle camera, or the like, which has a favorable optical performance, and which has a total angle of view of approximately 170 degrees.

2. Description of the Prior Art

Wide-angle lens systems for solid-state image sensors have been conventionally widely known. For example, Japanese Patent Application Laid-open No. H6-34879 and Japanese Patent Application Laid-open No. 2001-337268 disclose wide-angle lens system with three-lens-construction. However, these wide-angle lens systems have a total angle of view of 120 degrees which is insufficient to photograph super-wide-angle regions.

On the other hand, Japanese Patent Application Laid-open No. 2004-102162 discloses a super-wide-angle lens system that provides photographed regions with a total angle of view of approximately 170 degrees. However, this super-wide-angle lens system is composed of as very many as eight lens elements in total with a complicated structure and a very long total lens length.

SUMMARY OF THE INVENTION

In view of the problem described above, the present invention has been made, and it is an object of the invention to provide a low-cost, compact super-wide-angle lens system which has an excellent optical performance.

To achieve the object described above, a wide-angle lens system according to one aspect of the present invention essentially consists of: from the object side, (1) a first lens element formed of glass having both surfaces thereof so formed as to be spherical, having a meniscus shape convex to the object side, and having a negative optical power; (2) a second lens element having a meniscus shape convex to the image side and having a positive optical power; (3) an aperture stop; and (4) a third lens element having a meniscus shape convex to the image side and having a positive optical power.

To achieve the object described above, a wide-angle lens system according to another aspect of the invention essentially consists of: from the object side, (1) a first lens element formed of glass having both surfaces thereof so formed as to be spherical, having a meniscus shape convex to the object side, and having a negative optical power; (2) a second lens element formed of plastic having at least one aspherical surface and having a positive optical power; (3) an aperture stop; and (4) a third lens element formed of plastic having at least one aspherical surface and having a positive optical power.

In the above wide-angle lens system according to the invention, conditional formula (1) below is preferably satisfied:

$$2W > 150 \text{ degrees} \quad (1)$$

where
2W represents the total angle of view.

In the above wide-angle lens system according to the invention, conditional formula (2) below is preferably satisfied:

$$1 < T3/F < 3.5 \quad (2)$$

where
T3 represents the axial thickness of the second lens element, and
F represents the focal length of the entire system.

In the above wide-angle lens system according to the invention, conditional formula (3) below is preferably satisfied:

$$-0.5 < F/F1 < -0.1 \quad (3)$$

where
F represents the focal length of the entire system, and
F1 represents the focal length of the first lens element.

According to the present invention, a low-cost, compact wide-angle lens system having a favorable optical performance can be provided.

DESCRIPTION OF THE DRAWINGS

The above and other objects and features of the invention will be more clarified from description below concerning preferred embodiments of the invention and with reference to the accompanying drawings indicating the following.

FIG. 2 is a lens construction diagram of a wide-angle lens system according to a second embodiment (Example 2) of the invention;

FIG. 3A is a spherical aberration diagram of a lens system in Example 1;

FIG. 3B is an astigmatism diagram of the lens system in Example 1;

FIG. 3C is a distortion diagram of the lens system in Example 1;

DESCRIPTION OF THE PREFERRED EMBODIMENTS

A description will be given on embodiments of a wide-angle lens system according to the present invention, with reference to the accompanying drawings. In this document, the term "power" represents an amount defined by the reciprocal of a focal length.

Figure 1:
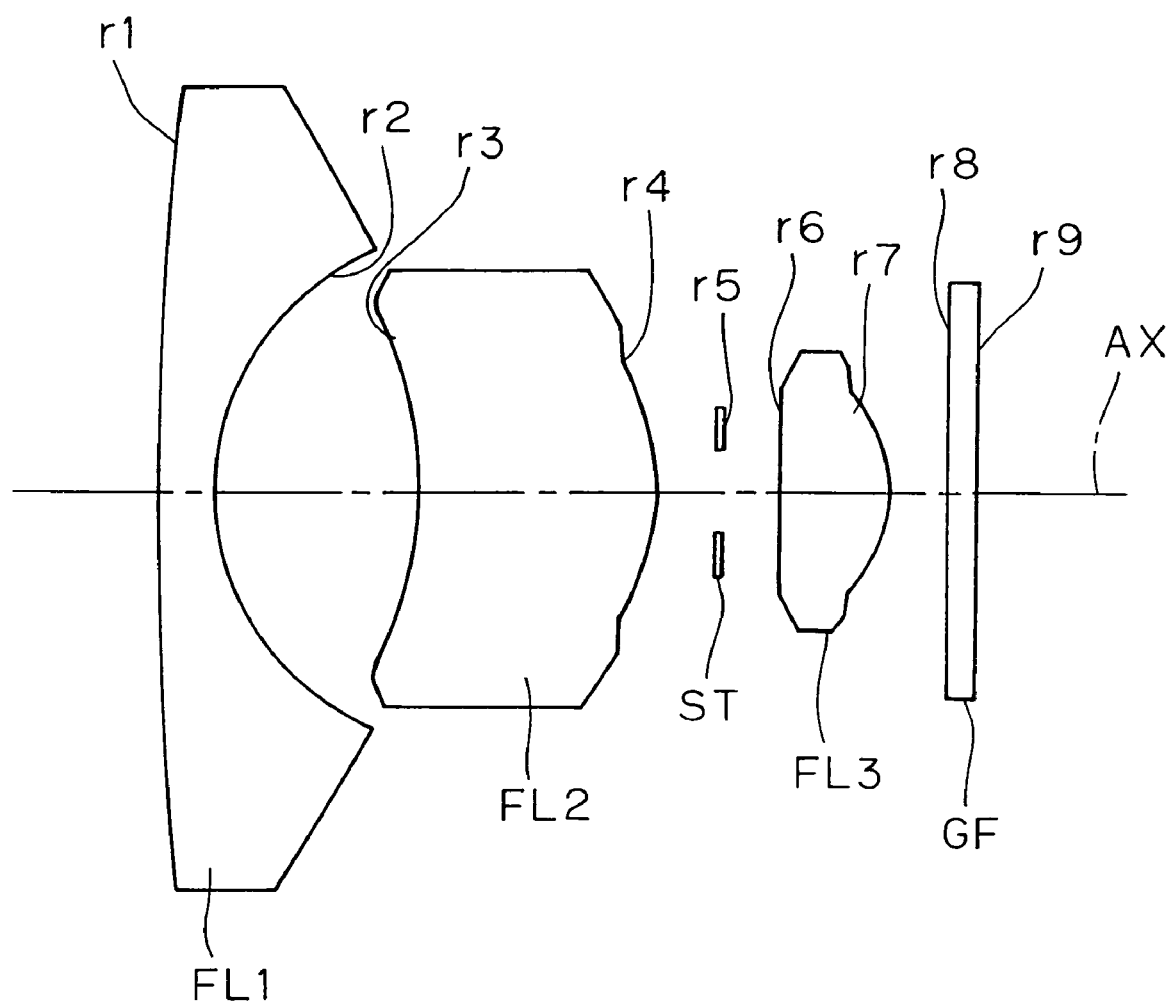
FIG. 1 is a lens construction diagram of a wide-angle lens system according to a first embodiment (Example 1) of the present invention.

FIGS. 1 and 2 show, in optical cross section, the construction of super-wide-angle lens systems of the first and second embodiments, respectively. The super-wide-angle lens systems are each a fixed focal length lens element that forms an optical image onto a solid-state image sensor, for example, a CCD. The super-wide-angle lens systems each include, a first lens element FL1 having a negative optical power, a second lens element FL2 having a positive optical power, an aperture stop ST, and a third lens element FL3 having a positive optical power in the order mentioned from the object side, and thus the number of lens elements included therein is three. On the image side of the third lens element FL3 is arranged a glass filter GF in the form of a parallel-plane plate corresponding to an optical low pass filter or the like.

More specifically, the first lens element FL1 is a glass lens element having a meniscus shape convex to the object side and having a negative optical power. The first lens element FL1 has both surfaces thereof so formed as to be spherical. Forming the surface of the lens element located on the most object side into a convex shape permits correction of distortion occurring on a lens element having a negative optical power. In addition, forming the first lens element FL1 on the most object side with a glass lens element permits reducing performance degradation caused by an environmental change such as a temperature change. Further, forming the first lens element FL1 with a spherical glass lens element permits achieving lower cost than forming it with an aspherical glass lens element.

The second lens element FL2 and the third lens element FL3 are each a plastic lens element having a meniscus shape convex to the image side and having a positive optical power. The second lens element FL2 and the third lens element FL3 each have both surfaces thereof so formed as to be aspherical. Forming the second lens element FL2 and the third lens element FL3 having a meniscus shape convex to the image side and having a positive optical power permits favorable correction of various aberration occurring on the first lens element FL1 having a negative optical power. In addition, forming each of the second lens element FL2 and the third lens element FL3 with a plastic lens element having at least one aspherical surface permits a more dramatic reduction in the number of lens elements used than forming each of them with a spherical glass lens element. This therefore permits a shorter total lens length and also permits providing a wide-angle lens system at low cost.

Next, a description will be given on conditional formulae to be satisfied by the wide-angle lens system of each embodiment. Note that it is not required to satisfy all the formulae described below at a time; therefore, a corresponding mechanism and effect can be achieved by separately satisfying an individual conditional formula in accordance with optical construction. From viewpoints of optical performance, downsizing, assembly and the like, it is obviously preferable that a plurality of conditional formulae be satisfied.

(Conditional Formula 1)

$$2W>150 \text{ degrees} \qquad (1)$$

where 2W represents the total angle of view.

The conditional formula (1) defines the condition for the total angle of view. If the conditional formula (1) is not satisfied, photographing a wide range cannot be performed, thus resulting in a failure to serve as a super-wide-angle lens system.

(Conditional Formula 2)

$$1<T3/F<3.5 \qquad (2)$$

where

T3 represents the axial thickness of the second lens element, and

F represents the focal length of the entire system.

The conditional formula (2) defines the condition for balancing the total length of the lens system and aberration correction for the second lens element (FL2). If the value of T3/F becomes equal to or lower than the lower limit of the formula (2), it becomes advantageous in reducing the total length of the lens system but results in remarkably worse aberration (curvature of field and distortion in particular). By contrast, if the value of T3/F becomes equal to or higher than the upper limit of the conditional formula (2), it becomes advantageous in terms of optical performance but results in a longer total length of the lens system. It is further preferable that conditional formula (2a) below be satisfied.

$$1.5<T3/F<3 \qquad (2a)$$

(Conditional Formula 3)

$$-0.5<F/F1<0.1 \qquad (3)$$

where

F represents the focal length of the entire system, and
F1 represents the focal length of the first lens element FL1.

The conditional formula (3) defines the condition for balancing the total lens length of the lens system and aberration correction for the first lens element FL1. If the value of F/F1 becomes equal to or lower than the lower limit of the conditional formula (3), it becomes advantageous in reducing the total length of the lens system but results in remarkably worse distortion. By contrast, if the value of F/F1 becomes equal to or higher than the upper limit of the formula (3), it becomes advantageous in correcting distortion but results in a longer total length of the lens system. It is further preferable that conditional formula (3a) below be satisfied.

$$-0.3<F/F1<0.2 \qquad (3a)$$

EXAMPLES

Hereinafter, practical examples of the image pickup lens embodying the present invention will be described in detail, with reference to their construction data and other data. Examples 1 and 2 presented below correspond to the first and the second embodiments, respectively. Thus, the lens construction diagrams (FIGS. 1 and 2) representing the first and second embodiments respectively show there corresponding lens construction of Examples 1 and 2.

In the construction data of each example, ri (i=1, 2, 3, . . . ) represents the radius of curvature (in mm) of the i-th surface counted from the object side; di (i=1, 2, 3, . . . ) represents the axial distance (in mm) of the i-th surface counted from the object side; and Σd represents the total length (in mm) of the optical system. Ni (i=1, 2, 3, . . . ) and vi (i=1, 2, 3, . . . ) represent the refractive index (Nd) for the d-line and the Abbe number (vd), respectively, of the i-th optical element counted from the object side. The focal length of the entire system (f, mm) and F number (FNO) are presented together with other data. Table 1 shows values corresponding to the conditional formulae.

In each example, a surface whose radius of curvature ri is marked with an asterisk (*) is a refractive optical surface having an aspherical shape, and is defined by formula (AS) below representing the shape of the aspherical surface. Aspherical surface data of each example is presented together with other data.

$$X(H)=(C \cdot H^2)/[1+\sqrt{(1-\epsilon \cdot C^2 \cdot H^2)}]+\Sigma(Ai \cdot Hi) \qquad (AS)$$

where
- X(H) represents the displacement in the direction of an optical axis AX at a height H (relative to the vertex);
- H represents the height in a direction perpendicular to the optical axis AX;
- C represents the paraxial curvature (=1/radius of curvature);
- ϵ represents the quadric surface parameter; and
- Aj represents the aspherical surface coefficient of the i-th order.

Figure 4A:
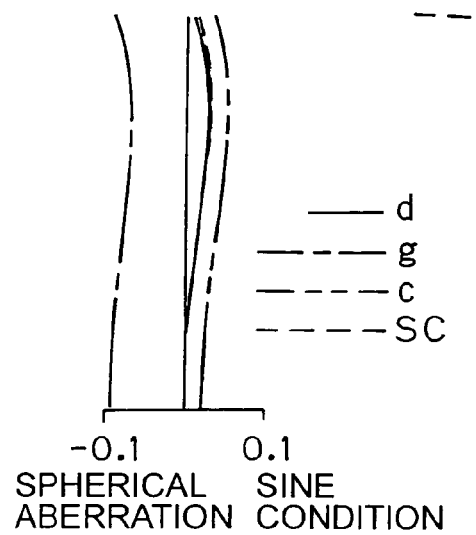
FIG. 4A is a spherical aberration diagram of a lens system in Example 2.
Figure 4B:
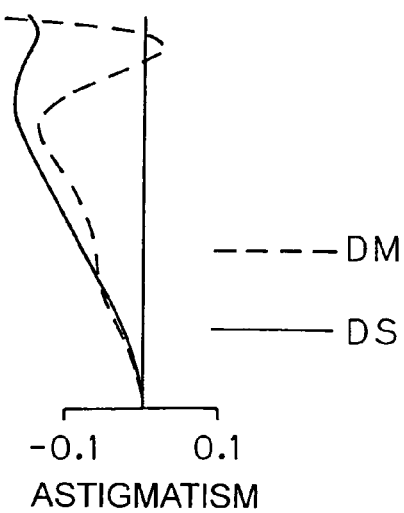
FIG. 4B is an astigmatism diagram of the lens system in Example 2.
Figure 4C:
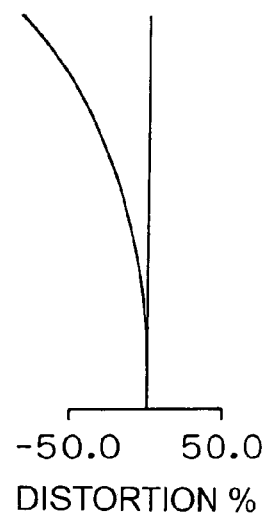
FIG. 4C is a distortion diagram of the lens system in Example 2.

FIGS. 3A to 3C are aberration diagrams for Example 1. FIGS. 4A to 4C are aberration diagrams for Example 2. FIGS. 3A and 4A show spherical aberration diagrams. FIGS. 3B and 4B show astigmatism diagrams. FIGS. 3C and 4C show distortion diagrams.

In the spherical aberration diagrams, a solid line d represents the spherical aberration (in mm) for the d-line, a chain single-dashed line g represents the spherical aberration (in mm) for the g-line, a chain double-dashed line c represents the spherical aberration (in mm) for the c-line, and a broken line SC represents the deviation (in mm) from the sine condition to be fulfilled. The vertical axis represents the F number (FNO) in the spherical aberration diagrams and the maximum image height Y' (in mm) in the astigmatism and distortion diagrams. In the astigmatism diagrams, a broken line DM represents the astigmatism (in mm) for the d-line on the meridional surface, and a solid line DS represents the astigmatism (in mm) for the d-line on the sagittal surface. In the distortion diagrams, a solid line represents the distortion (in %) for the d-line.

Example 1 f=2.097
FNO=2.8

| [Radius of curvature] | [Axial distance] | [Refractive index] | [Abbe number] |
|---|---|---|---|
| r1 = 66.638 | d1 = 1.053 | N1 = 1.58913 | ν1 = 61.25(FL1) |
| r2 = 4.898 | d2 = 3.592 | N2 = 1.52510 | ν2 = 56.38(FL2) |
| r3* = −6.435 | d3 = 4.212 | N3 = 1.52510 | ν3 = 56.38(FL3) |
| r4* = −3.405 | d4 = 1.169 | N4 = 1.51680 | ν4 = 64.20(GF) |
| r5 = ∞(ST) | d5 = 1.091 | | |
| r6* = −21.168 | d6 = 1.976 | | |
| r7* = −2.124 | d7 = 1.000 | | |
| r8 = ∞ | d8 = 0.500 | | |
| r9 = ∞ | Σd = 14.593 | | |

[Aspherical Surface Data of the Third Surface (r3)]
ϵ=1.0
$A4=0.15045 \times 10^{-2}$
$A6=0.16607 \times 10^{-3}$
$A8=-0.40815 \times 10^{-4}$
$A10=0.21958 \times 10^{-5}$

[Aspherical Surface Data of the Fourth Surface (r4)]
ϵ=1.0
$A4=0.13444 \times 10^{-1}$
$A6=-0.16674 \times 10^{-2}$
$A8=0.18304 \times 10^{-3}$
$A10=-0.45788 \times 10^{-6}$

[Aspherical Surface Data of the Sixth Surface (r6)]
ϵ=1.0
$A4=-0.10863 \times 10^{-1}$
$A6=-0.16249 \times 10^{-2}$
$A8=0.88957 \times 10^{-2}$
$A10=-0.20908 \times 10^{-2}$

[Aspherical Surface Data of the Seventh Surface (r7)]
ϵ=1.0
$A4=0.12301 \times 10^{-1}$
$A6=0.24208 \times 10^{-2}$
$A8=-0.96666 \times 10^{-3}$
$A10=0.53821 \times 10^{-3}$

Example 2 f=1.875
FNO=2.8

| [Radius of curvature] | [Axial distance] | [Refractive index] | [Abbe number] |
|---|---|---|---|
| r1 = 30.486 | d1 = 1.327 | N1 = 1.72916 | ν1 = 54.67(FL1) |
| r2 = 4.779 | d2 = 3.677 | N2 = 1.52510 | ν2 = 56.38(FL2) |
| r3* = −6.646 | d3 = 4.633 | N3 = 1.52510 | ν3 = 56.38(FL3) |
| r4* = −3.158 | d4 = 0.810 | N4 = 1.51680 | ν4 = 64.20(GF) |
| r5 = ∞ (ST) | d5 = 1.195 | | |
| r6* = −11.029 | d6 = 1.978 | | |
| r7* = −1.971 | d7 = 1.000 | | |
| r8 = ∞ | d8 = 0.400 | | |
| r9 = ∞ | Σd = 15.019 | | |

[Aspherical Surface Data of the Third Surface (r3)]
ϵ=1.0
$A4=0.54002 \times 10^{-2}$
$A6=-0.85537 \times 10^{-3}$
$A8=0.72417 \times 10^{-4}$
$A10=-0.27045 \times 10^{-5}$

[Aspherical Surface Data of the Fourth Surface (r4)]
ϵ=1.0
$A4=0.20553 \times 10^{-}$
$A6=-0.57032 \times 10^{-2}$
$A8=0.13338 \times 10^{-2}$
$A10=-0.71240 \times 10^{-4}$

[Aspherical Surface Data of the Sixth Surface (r6)]
ϵ=1.0
$A4=-0.39253 \times 10^{-2}$
$A6=-0.57908 \times 10^{-2}$
$A8=0.13485 \times 10^{-1}$
$A10=-0.36536 \times 10^{-2}$

[Aspherical Surface Data of the Seventh Surface (r7)]
ϵ=1.0
$A4=0.15550 \times 10^{-1}$
$A6=0.64826 \times 10^{10-2}$
$A8=-0.23296 \times 10^{-2}$
$A10=0.90055 \times 10^{-3}$ Values corresponding to the parameters defined by the conditional formulae of each example are presented below.

TABLE 1

| Conditional formula | (1) 2W | (2) T3/F | (3) F/F1 |
|---|---|---|---|
| Example 1 | 170.8 degrees | 2.01 | −0.23 |
| Example 2 | 167.5 degrees | 2.47 | −0.24 |

In each of the examples, all the optically functioning surfaces are formed with refractive optical surfaces, but they may be formed with those other than refractive optical surfaces, for example, reflective surfaces or diffractive surfaces.

As described above, the present invention can achieve a low-cost, compact super-wide-angle lens system having a favorable optical performance and a wide total angle of view as an image pickup lens system for a solid-state image sensor formed with three-lens construction. Thus, application of this super-wide-angle lens system to the image pickup lens system of a digital image pickup apparatus such as a TV telephone, a door phone, a monitoring camera, an in-car camera, or the like contributes to angle widening, function enhancement, cost saving, and downsizing of such a digital image pickup apparatus.

It is obvious from the description above that many modifications and variations may be made to the present invention. Therefore, it should be understood that the present invention may be carried out in any manner other than those described above.

What is claimed is:

1. A wide-angle lens system essentially consisting of: from an object side,
    a first lens element formed of glass having both surfaces thereof so formed as to be spherical, having a meniscus shape convex to the object side, and having a negative optical power;
    a second lens element having a meniscus shape convex to an image side and having a positive optical power;
    an aperture stop; and
    a third lens element having a meniscus shape convex to the image side and having a positive optical power.

2. The wide-angle lens system according to claim 1, wherein conditional formula (1) below is satisfied:

$$2W > 150 \text{ degrees} \tag{1}$$

where
    2W represents a total angle of view.

3. The wide-angle lens system according to claim 1, wherein conditional formula (2) below is satisfied:

$$1 < T3/F < 3.5 \tag{2}$$

where
    T3 represents an axial thickness of the second lens element, and
    F represents a focal length of the entire system.

4. The wide-angle lens system according to claim 1, wherein conditional formula (3) below is satisfied:

$$-0.5 < F/F1 < -0.1 \tag{3}$$

where
    F represents a focal length of the entire system, and
    F1 represents a focal length of the first lens element.

5. A wide-angle lens system essentially consisting of: from an object side,
    a first lens element formed of glass having both surfaces thereof so formed as to be spherical, having a meniscus shape convex to the object side, and having a negative optical power;
    a second lens element formed of plastic having at least one aspherical surface and having a positive optical power;
    an aperture stop; and
    a third lens element formed of plastic having at least one aspherical surface and having a positive optical power.

6. The wide-angle lens system according to claim 5, wherein conditional formula (1) below is satisfied:

$$2W > 150 \text{ degrees} \tag{1}$$

where
    2W represents a total angle of view.

7. The wide-angle lens system according to claim 5, wherein conditional formula 2 below is satisfied:

$$1 < T3/F < 3.5 \tag{2}$$

where
    T3 represents an axial thickness of the second lens element, and
    F represents a focal length of the entire system.

8. The wide-angle lens system according to claim 5, wherein conditional formula (3) below is satisfied:

$$-0.5 < F/F1 < -0.1 \tag{3}$$

where
    F represents a focal length of the entire system, and
    F1 represents a focal length of the first lens element.

* * * * *